United States Patent
Martin

(10) Patent No.: US 7,258,603 B1
(45) Date of Patent: Aug. 21, 2007

(54) UTENSIL FOR OPENING A SHELL OF A CRUSTACEAN

(76) Inventor: Daniel M. Martin, 5135 Verdin St., Lafitte, LA (US) 70067

( * ) Notice: Subject to any disclaimer, the term of this patent is extended or adjusted under 35 U.S.C. 154(b) by 0 days.

(21) Appl. No.: 11/490,756

(22) Filed: Jul. 22, 2006

(51) Int. Cl.
*A22C 29/02* (2006.01)

(52) U.S. Cl. .......................................................... 452/6

(58) Field of Classification Search ............... 452/1–6, 452/102–105
See application file for complete search history.

(56) References Cited

U.S. PATENT DOCUMENTS

| | | | | |
|---|---|---|---|---|
| 753,048 | A * | 2/1904 | Des Moinaux | 30/233 |
| 3,902,206 | A * | 9/1975 | Naquin | 7/107 |
| 4,092,774 | A * | 6/1978 | Watts | 30/92 |
| 4,607,544 | A * | 8/1986 | Jewell, Jr. | 81/9.4 |
| 4,716,627 | A * | 1/1988 | Scott, Jr. | 452/6 |
| 5,560,107 | A * | 10/1996 | Herbert | 30/90.1 |
| 5,894,617 | A * | 4/1999 | Liou | 7/107 |
| 6,202,517 | B1 * | 3/2001 | Dolan | 81/427 |
| 6,588,039 | B1 * | 7/2003 | Bates | 7/107 |
| 6,817,937 | B1 * | 11/2004 | Merritt | 452/103 |
| 6,848,139 | B2 * | 2/2005 | Simon et al. | 7/127 |

* cited by examiner

*Primary Examiner*—Thomas Price
(74) *Attorney, Agent, or Firm*—Keaty Professional Law Corporation

(57) ABSTRACT

A utensil for opening a shell of a crustacean, such as a crab, lobster and the like, has a pair of pivotally connected elongated members. Each elongate member has a handle portion and a head portion. A cutting blade is positioned in each of the head portions; the cutting blades are selectively brought in contact with the shelled crustacean positioned between the blades to sever the shell along a selected cut line without damaging the meat of the crustacean.

13 Claims, 2 Drawing Sheets

UTENSIL FOR OPENING A SHELL OF A CRUSTACEAN

BACKGROUND OF THE INVENTION

This invention relates to a utensil for opening and removal of meat from crab legs or other types of shellfish. More particularly, this invention relates to a hand tool for severing the shell of a crab leg, lobster shell or the like.

Crabs, lobsters and other crustaceans are cooked in boiled water and often served in the shell. A person desiring the extract the meat of the crustacean must first crack the shell and then remove the meat for consumption. Conventionally, the diners use a pliers-type instrument that has a pair of lever arms joined pivotally at one end. A user places a leg of a crab or lobster between the lever arms and closes the lever arms, thereby crushing the shell. Since the crustacean shells have a variety of shapes and sizes, as well as the degree of brittleness, the shell and the meat are often crushed into small fragments that are not easy to separate. The user picks at the fragments, pulling small pieces of meat, which is frustrating and time-consuming.

An alternative is to use a fork for extracting the meat after the shell has been cracked, or even attempting to break the shell using the fork. This alternative is not very appealing since the sharp tines of the fork may pierce the user's shin if an excessive force is used on the crustacean's shell. In the case of snow crabs legs, the user may be further frustrated since the snow crab legs are relatively thin, soft when cooked and extracting meat from crushed legs is often difficult.

The present invention contemplates elimination of drawbacks associated with the prior art and provision of a hand-operated utensil that can open the shell of a crustacean without any substantial mechanical damage to the meat.

SUMMARY OF THE INVENTION

It is, therefore an object of the present invention to provide a utensil for opening a shell of crustacean.

It is another object of the present invention to provide a hand-held utensil for opening the crustacean's shell without causing any substantial damage to the meat contained in the shell.

These and other objects of the invention are achieved through a provision of a utensil, or device for opening a shell of a crustacean, which comprises a pair of elongated rigid members, each having a handle portion and a head portion unitary secured to the handle portion. The head portion has a proximal end where it is attached to the handle portion and a distal end. A pivot pin inserted through corresponding openings in the distal ends of the head portions pivotally secures the two elongated members together.

Each of the head portions has a concave inner surface provided with a groove. A cutting blade is detachably positioned within the groove. The cutting blade has a main concave part, a second concave part and an intermediate inwardly extending part. The main concave parts form a main opening for receiving a shelled crustacean therein. The secondary concave parts form a secondary opening for receiving a smaller size shelled crustacean.

A user places the shelled crustacean in the main opening or the secondary opening and pivots the handle portion and the head portion causing the cutting blade members to contact the shell of the crustacean and cut through the shell. The user manipulates the handles and the crustacean to execute a substantially straight cut along a selected cut line in the shell without damaging the meat in the shell.

BRIEF DESCRIPTION OF THE DRAWINGS

Reference will now be made to the drawings, wherein like parts are designated by like numerals, and wherein.

DETAILED DESCRIPTION OF THE PREFERRED EMBODIMENT

Figure 1:
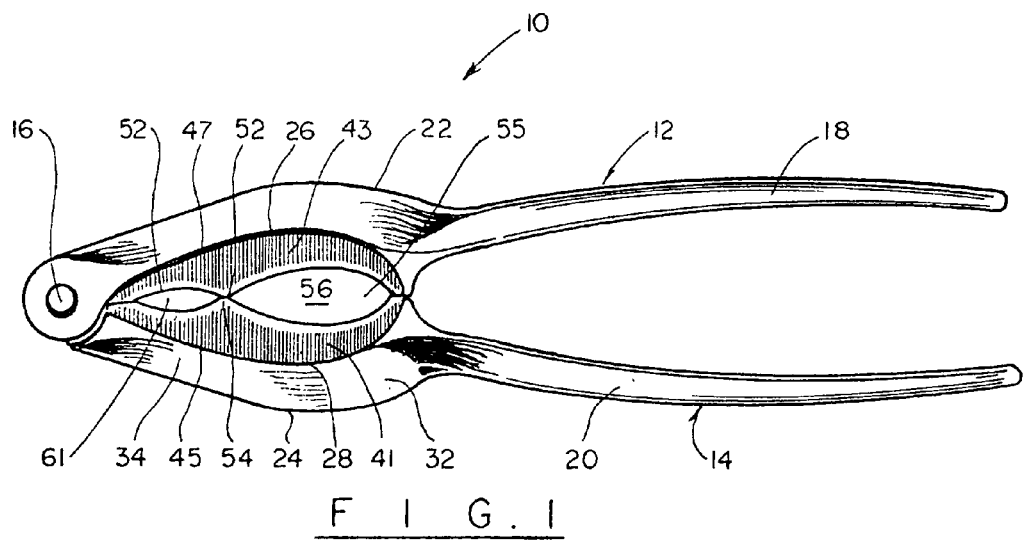
FIG. 1 is a perspective view of the shell-opening utensil in accordance with the present invention.

Turning now to the drawings in more detail, numeral 10 designates the utensil for opening the crustacean's shell of the present invention. The device 10 comprises a pair of pivotally connected, closely spaced, elongate members 12 and 14. Each elongate member 12 and 14 comprises a handle portion 18, 20, respectively, and a head portion 22, 24, respectively. The handle portions 18 and 20 are mirror images of each other and extend a distance from each other along a major part of the longitudinal extensions thereof. The handle portions 18 and 20 have inwardly extending handle parts 19, 21 that converge before joining with their respective head portions 22 and 24.

The head portions 22, 24 are integrally formed with their respective handle portions 12 and 14. A pivot pin 16 is inserted through corresponding openings formed in the head portions 22 and 24, thereby allowing pivotal movement between the elongate members 12 and 14.

The head portions 22, 24 are each provided with a concave inner surface 26, 28, respectively. A groove 30 is formed in the surface 28 extending from one end 32 to the second end 34 of the head portion 24. A similar groove is formed in the inner surface 26 of the head portion 22.

A cutting blade 40 is fitted in the groove 30, and a cutting blade 42 is fitted in the groove of the head portion 22. The mutually facing blades 40 and 42 are mirror images of each other and each has a concave main blade part 41, 43, respectively, and a concave secondary blade part 45, 47, respectively. Each blade 40 and 42 has a sharpened inner surface or edge to facilitate cutting of the crustacean shell therewith. The sharp edges allow the user to more easily cut the shell as compared to blunt shell cracking device conventionally used for the purpose of shell cracking.

A bridge between the main blade parts 41, 43 and secondary blade parts 45, 47 is formed by inwardly curving blade portions 52, 54. A main opening 56 is formed by the main blade parts 41, 43. The opening 56 has a generally oval configuration with a distant part 55 and a proximate part 57.

A secondary opening 58 is formed between the secondary blade parts 45, 47. The secondary opening has a generally oval configuration, with a proximate part 59 and a distant part 61. The bridge separates the main opening 56 from the secondary opening 58. The main opening 56 has a greater size in comparison with the secondary opening 58 for cutting different size shells.

Figure 2:
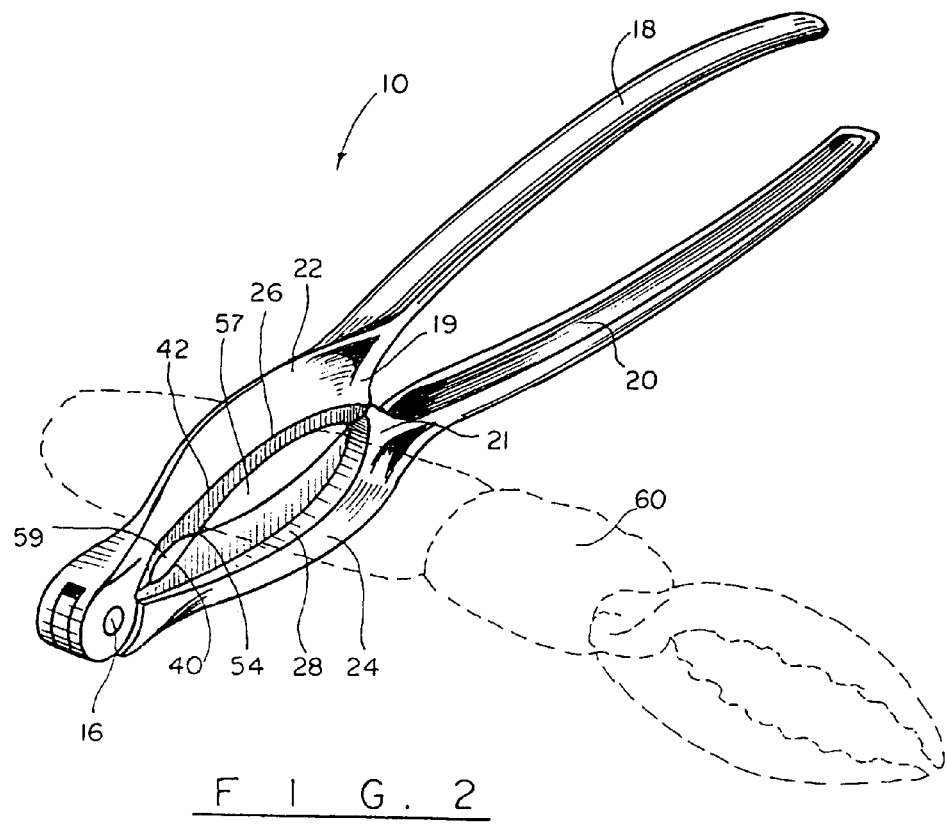
FIG. 2 is a perspective view of the shell-opening utensil in accordance with the present invention with the shell being opened shown in phantom lines.
Figures 3, 4, 5:
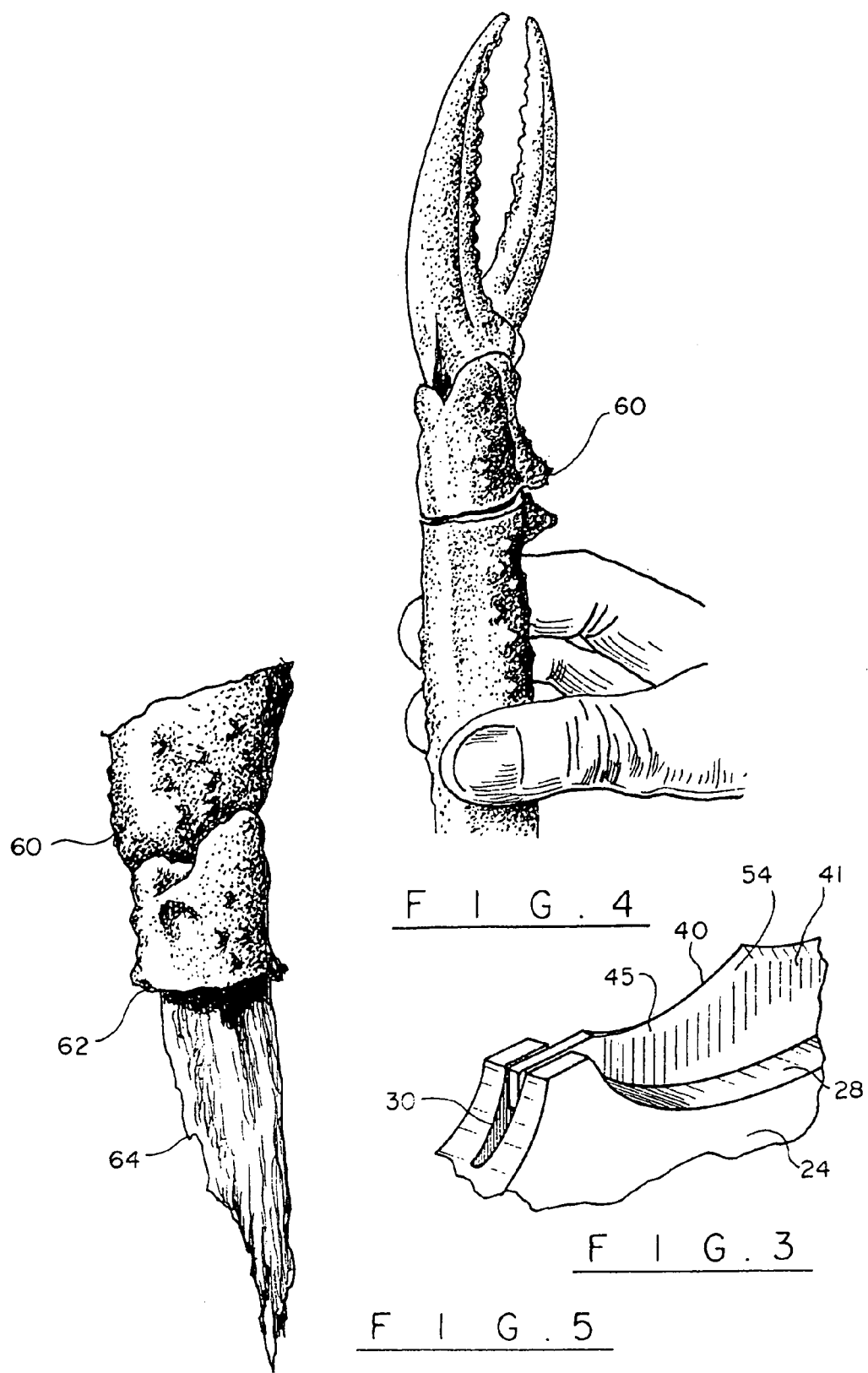
FIG. 3 is a detail view illustrating the shell cutting blade positioned in the opening of the tool.
FIG. 4 is a perspective view illustrating a crab claw, an example of a crustacean shell that can be opened with the shell opener device of the present invention.
FIG. 5 is a perspective view illustrating a straight cut through the shell of a crustacean executed with the help of the shell opener device of the present invention.

The distance of separation between facing main blade parts 41, 43 and secondary blade parts 45, 47 is determined by the thickness of average crustacean shells so that the shell may easily be placed between the blades 40, 42. The main opening 56 is sized to accommodate larger crustacean shells, for instance a crab or lobster leg 60 shown in phantom lines in FIG. 2. The secondary opening 58 is sized to accommodate smaller size crustacean shells, for instance snow crab legs.

The pivot pin 16 allows the handle portions 18, 20 and the head portions 22, 24 move towards and away from each other. The length of the handle portions 18 and 20 is selected to be comfortable for a user to grip the handle portions in his or her hand and be able to exercise a reasonable degree of control over the pivotal movement of the head portions 22, 24 so as to cut through the shell of the crustacean but not the meat inside.

In use, a person grips the handle portions 18 and 20 with one hand, and places the crustacean 60 between the blades 40, 42 either in the main opening 56 or a secondary opening 58, depending on the shell size. The user than manipulates the handle portions 18, 20 relative to the shell 60 of the crustacean so that the shell is cut or severed along a cut line 62, which is substantially a continuous line. The bridge between the inwardly curving parts 52, 54 can be used for cutting through the crustacean shells, whose size is large than the secondary opening 58. The user can simply rotate the device 10 around the thin shell and cut through the shell wall with the blade sharpened edge.

The user can easily stop the squeezing motion on the handle portions 18, 20 as soon as the user detects that the shell has been cut. Since the meat 64 would offer a different resistance to the cutting blades 40, 42, the user can prevent damage to the meat 64 by terminating the squeezing action on the handle portions 18, 20. The inwardly extending handle parts 19 and 21 will effectively stop the squeezing motion on the handle portions 18 and 20 once the handle parts 19 and 21 come into contact with one another.

Once the shell has been cut along the cut line 62, the user can remove the cut portion of the shell 60, exposing the meat 64 for consumption. Depending on the location of the cut line 62, the user can remove a large or small portion of the crustacean meat from the shell 60. The handle portion 18 and the head portion 22 can also be integrally constructed at one piece. The handle portion 20 and the head portion 24 can also be integrally constructed as one piece. The device 10 can be made of a durable, non-corrosive material, such as stainless steel, aluminum and the like. The device 10 be washed and sanitized in the same manner as other table utensils. The exemplary embodiment shown in the drawings, illustrates the head portions 22, 24 having outwardly convex outer surfaces. Of course, the outer surface can be formed planar, if desired.

If desired, the blades 40, 42 can be detachably mounted in their respective head portions 22, 24 and changed of they become damaged or blunted. An alternative to using a geometric shape of the double-concave blades 40 42 would be to use continuously curving blades, which would form one opening between the head portions 22, 24. Still another alternative is to have the openings for receiving a shelled crustacean to be approximately same size. Still further alternative would be to have the opening 56, 58 formed not as generally oval openings shown in the drawings but more round openings, covering more surface area of the crustacean shell.

The handle portions 18 and 20 may be formed as cylindrical bodies, either solid or hollow. The length of the handle portions 18 and 20 is selected to reduce strain on the hand of the user when cutting through the crustacean shell. If desired, the exterior surface of the handle portions 18 and 20 may have a friction-increasing cover to facilitate gripping of the handle portions by the user.

Many changes and modifications can be made in the design of the present invention without departing from the spirit thereof. I therefore pray that my rights to the present invention be limited only by the scope of the appended claims.

I claim:

1. A device for opening a shell of a crustacean, comprising:
    a first elongated rigid member having a first handle portion and a first head portion secured to the first handle portion;
    a second elongated rigid member having a second handle portion and a second head portion secured to the second handle portion, the first elongated rigid member being pivotally connected to the second elongated rigid member; and
    wherein each of said first head portion and said second head portion carrying a cutting blade means on an inner surface thereof for engaging a shelled crustacean therebetween and for cutting through the crustacean shell, and wherein said first head portion and said second head portion each have a concave inner surface, and wherein a groove is formed in said inner surface for receiving the cutting blade means therein.

2. The device of claim 1, wherein said cutting blade means comprises a sharpened blade member having a first concave blade part, a second concave blade part, and an inwardly extending intermediate blade part formed between the first concave blade part and the second concave blade part.

3. The device of claim 2, wherein said the first concave blade part of the first head portion is substantially a mirror image of the first concave blade part of the second head portion.

4. The device of claim 2, wherein a main opening for receiving a shelled crustacean is formed between opposing first concave blade parts of the first head portion and the second head portion.

5. The device of claim 4, wherein a secondary opening for receiving a shelled crustacean is formed between opposing second blade parts of the first head portion and the second head portion.

6. The device of claim 5, wherein said main opening has a size greater than the secondary opening.

7. A device for opening a shell of a crustacean, comprising:
    a first elongated rigid member having a first handle portion and a first head portion secured to the first handle portion;
    a second elongated rigid member having a second handle portion and a second head portion secured to the second handle portion, the first elongated rigid member being pivotally connected to the second elongated rigid member; and
    wherein each of said first head portion and said second head portion carrying a cutting blade means on an inner surface thereof for engaging a shelled crustacean therebetween and for cutting through the crustacean shell, said cutting blade means comprising a sharpened blade member having a first concave blade part, a second concave blade part, and an inwardly extending intermediate blade part formed between the first concave blade part and the second concave blade part, wherein a main opening for receiving a shelled crustacean is formed between opposing first concave blade parts of the first head portion and the second head portion, a secondary opening for receiving a shelled crustacean is formed between opposing second blade parts of the first head portion and the second head portion, and wherein the main opening and the secondary opening each have a generally oval configuration.

8. A method of opening a shell of a crustacean, comprising the steps of:
providing a first elongated rigid member having a first handle portion and a first head portion secured to the first handle portion;
providing a second elongated rigid member having a second handle portion and a second head portion secured to the second handle portion, the first elongated rigid member being pivotally connected to the second elongated rigid member, wherein the first handle portion is positioned in a spaced relationship to the second handle portion;
providing a cutting blade means secured on an inner surface of each of said first head portion and said second head portion;
providing a groove in an inner surface of each of said first head portion and said second head portion for receiving the cutting blade means therein;
positioning a shelled crustacean between the cutting blade means of the first head portion and the second head portion;
moving the handle portions towards each other, thereby causing the cutting blade means to contact the shell of a crustacean and cut through the shell, thereby severing the shell along a selected cut line without imparting any substantial mechanical damage to crustacean's meat.

9. The method of claim 8, wherein each of said blade means comprises a sharpened blade member having a first concave blade part, a second concave blade part, and an inwardly extending intermediate blade part formed between the first concave blade part and the second concave blade part.

10. The method of claim 9, wherein said the first concave blade part of the first head portion is substantially a mirror image of the first concave blade part of the second head portion.

11. The method of claim 9, wherein a main opening for receiving a shelled crustacean is formed between opposing first concave blade parts of the first head portion and the second head portion.

12. The method of claim 11, wherein a secondary opening for receiving a shelled crustacean is formed between opposing second blade parts of the first head portion and the second head portion.

13. The method of claim 12, wherein said main opening has a size greater than the secondary opening.

* * * * *